S. J. DOBRZYNSKI.
DEMOUNTABLE RIM.
APPLICATION FILED JULY 30, 1915.
1,166,043.
Patented Dec. 28, 1915.
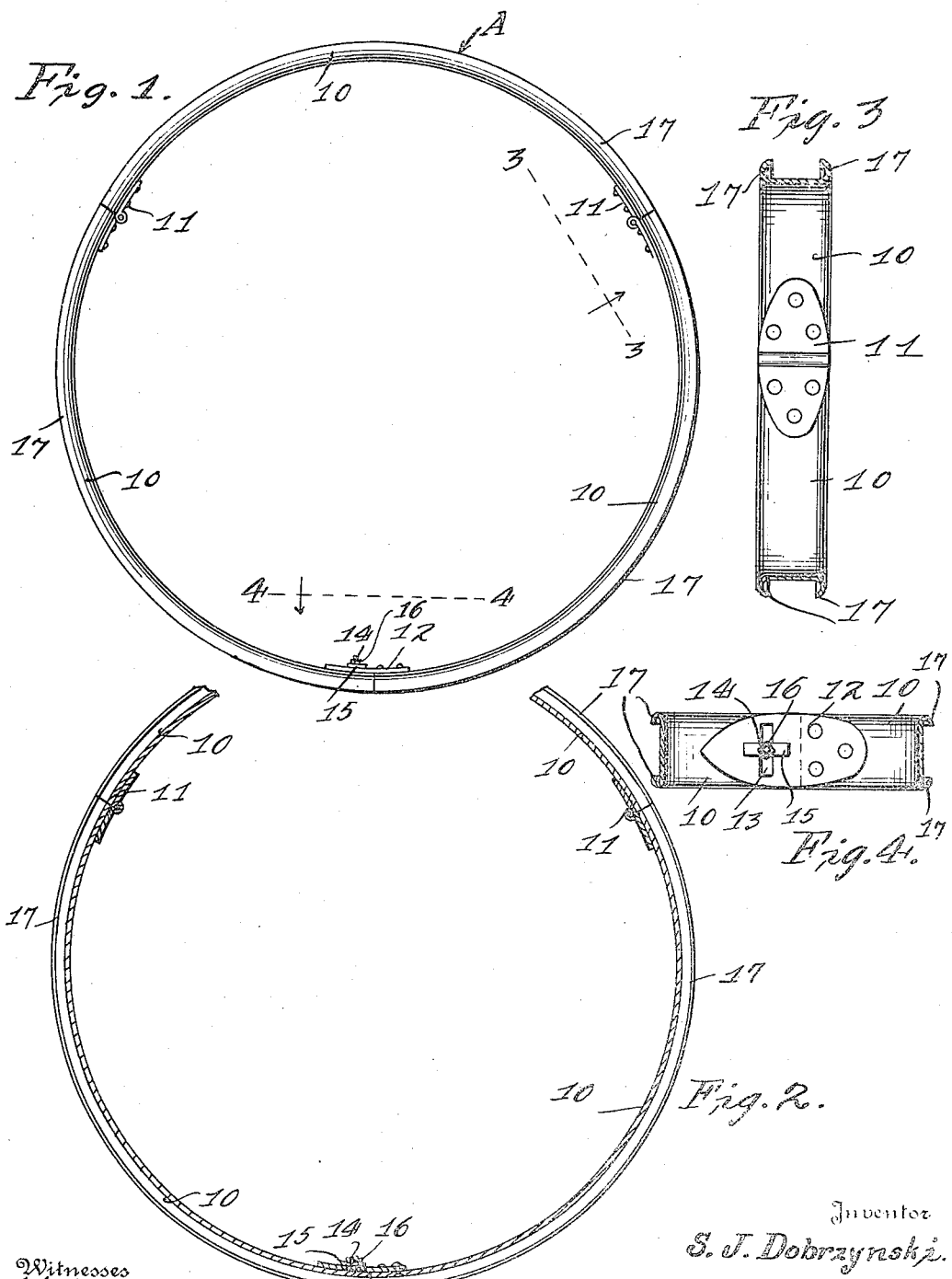

UNITED STATES PATENT OFFICE.

STANLEY J. DOBRZYNSKI, OF CUYAHOGA FALLS, OHIO.

DEMOUNTABLE RIM.

1,166,043.  Specification of Letters Patent.  Patented Dec. 28, 1915.

Application filed July 30, 1915. Serial No. 42,798.

*To all whom it may concern:*

Be it known that I, STANLEY J. DOBRZYNSKI, a citizen of the United States, residing at Cuyahoga Falls, in the county of Summit, State of Ohio, have invented certain new and useful Improvements in Demountable Rims; and I do hereby declare the following to be a full, clear, and exact description of the invention, such as will enable others skilled in the art to which it appertains to make and use the same.

This invention relates to demountable rims for use on automobile wheels to secure the tire thereto.

The object of the invention is to provide a rim of the type named embodying an improved construction whereby same may be secured in proper relation to a pneumatic tire with facility and little labor.

A further object of the invention is to provide a rim which will be simple in construction, efficient in use and which can be manufactured at a relatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a rim constructed in accordance with the invention; Fig. 2, a vertical section of same; Fig. 3, a section on the line 3—3 of Fig. 1, and Fig. 4, a section on the line 4—4 of Fig. 1.

Referring to the drawings A indicates generally the improved rim which comprises a plurality of sections 10 connected together by means of hinges 11. One of the end sections 10 has secured to the inner side thereof a plate 12 which projects beyond the free end of said sections. Formed in the portion of the plate 12 which projects beyond the free end of the related section is a transverse slot 13 for a purpose that will presently appear. The other end section 10 has secured thereto in a suitable manner upon its inner face a threaded projection 14 upon which is engaged a locking key 15 through the medium of a nut 16. The key 15 is of slightly less length than the slot 13 and in setting up the rim within a tire the key 15 is disposed transversely of the rim and inserted through the slot 13 after which it is turned to a position at right angles to the slot whereby the rim is locked in set up position. To disengage the rim from the tire it is only necessary to turn the key 15 parallel to the slot 13 when the various sections can be swung inwardly and the rim readily removed from the interior of the tire in a collapsed form. The rim A may be of any desired form in cross section and in this instance it is shown provided with curved bead securing flanges 17.

While one particular form has been shown for carrying the invention into practice it will be understood that various changes in the arrangement and shape of the parts may be resorted to without departing from the scope of the invention set forth in the appended claim.

What is claimed is:—

A demountable tire holding rim embodying a series of arcuate sections hinged together at their adjoining extremities and each provided with tire retaining flanges, one of the limiting sections having a plate secured to the free end thereof and projecting beyond said end, the portion of said plate projecting beyond the end being provided with a transverse slot, a stud mounted on the other limiting section, a key axially adjustable on said stud and insertible through the slot in the plate whereby the key may be adjusted at right angles to the slot, and means for locking the key against axial adjustment when disposed at right angles to the slot whereby the free ends of the limiting sections are detachably secured together.

In testimony whereof, I affix my signature, in the presence of two witnesses.

STANLEY J. DOBRZYNSKI.

Witnesses:
FRANK KANECHI,
F. O. VAIL.

Copies of this patent may be obtained for five cents each, by addressing the "Commissioner of Patents, Washington, D. C."